United States Patent [19]

Hashiuchi et al.

[11] Patent Number: 5,356,712
[45] Date of Patent: Oct. 18, 1994

[54] MAGNETITE PARTICLES

[75] Inventors: Masachika Hashiuchi; Akira Oyama; Tadashi Yamanishi, all of Tamano, Japan

[73] Assignee: Mitsui Mining & Smelting Co., Ltd., Tokyo, Japan

[21] Appl. No.: 940,313

[22] Filed: Sep. 3, 1992

[30] Foreign Application Priority Data

Sep. 13, 1991 [JP] Japan .................. 3-261345

[51] Int. Cl.$^5$ ............................................. C01G 49/08
[52] U.S. Cl. .................................. 428/404; 252/62.59
[58] Field of Search ..................... 252/62.59; 428/404

[56] References Cited

U.S. PATENT DOCUMENTS

| | | | |
|---|---|---|---|
| 4,321,302 | 3/1982 | Umeki et al. | 252/62.59 |
| 4,873,010 | 10/1989 | Takedoi et al. | 252/62.59 |
| 4,975,214 | 4/1990 | Sakashita et al. | 252/62.59 |

FOREIGN PATENT DOCUMENTS

| | | |
|---|---|---|
| 0187434 | 7/1986 | European Pat. Off. . |
| 0247884 | 12/1987 | European Pat. Off. . |
| 0331015 | 9/1989 | European Pat. Off. . |
| 51-44298 | 4/1976 | Japan .................. 252/62.59 |

OTHER PUBLICATIONS

Patent Abstracts of Japan, vol. 12, No. 172 (C-497)(3019) May 21, 1988 & JP-A-62 278 131 (Canon) Dec. 3, 1987 *abstract*.
Patent Abstracts of Japan, vol. 12, No. 219 (C-506)(3066) Jun. 22, 1988 & JP-A-63 017 222 (Toda Kogyo) Jan. 25, 1988 *abstract*.
Patent Abstracts of Japan, vol. 10, No. 185 (C-357) 27 Jun. 1986 & JP-A-61 034 070 (Titan Kogyo KK) Feb. 18, 1986 *abstract*.
Patent Abstracts of Japan, vol. 11, No. 52 I(-P-548)(2499) Feb. 18, 1987 & JP-A-61 219 959 (Canon) Sep. 30, 1986 *abstract*.

*Primary Examiner*—Jack Cooper
*Attorney, Agent, or Firm*—Bucknam and Archer

[57] ABSTRACT

This invention provides magnetite particles containing a silicon component inside and also a silicon component exposed on the surface of each particle, which are improved in the properties of electrical resistance, remanent magnetization, and fluidity in a well-balanced way and suited for use principally as powdery material for magnetic toner for electrostatic copying and as black pigment powder for coating materials; and also relates to a process for producing the particles.

3 Claims, No Drawings

MAGNETITE PARTICLES

BACKGROUND OF THE INVENTION

1. Field of the Invention

This invention relates to magnetite particles and a process for producing the same. More particularly, it relates to magnetite particles each of which has silicon components in the interior and on its surface respectively, and is improved in properties, i.e. electrical resistance, remaining magnetization and fluidity, in a well-balanced way by controlling the amount (in terms of silicon) of the silicon component exposed on the surface, and is suited for use principally as powdery material for magnetic toner for electrostatic copying and as black pigment powder for coating materials. It also relates to a process for producing the particles.

2. Prior Art

Magnetite particles obtained by aqueous solution reaction have recently been widely used as magnetic toner materials for dry electronic copiers, printers, etc. The magnetic toner is required to possess various general developing characteristics. The advance of electrophotography in recent years has encouraged rapid progress in copying machines and printers, especially those using the digital technology, with the consequence that the requirements for performances of the magnetic toner have become more severe, The apparatus is required to output not merely characters as in the past but also graphics, photographs, etc. Some latest printers offer a print quality of 400 or more dots per inch, producing finer and clearer latent images on the photoreceptor. To keep pace with this, accordingly high fine-line reproducibility in development has been strongly desired.

Second, the magnetite particles themselves are required to have a high enough electrical resistance to stabilize the image density during electrostatic transfer of an image.

Magnetite particles which meet these requirements have been proposed. As improvements pertaining to the first problem, U.S. Pat. No. 4,992,191 and Japanese Patent Application Laid-Open Gazettes Nos. (sho.)61-155223 (155223/1986) and (sho.)62-278131(278131/1987) disclose magnetite particles containing a silicon component in their interior only. These particles are not fully satisfactory as yet in providing image quality with improved fine-line reproducibillty. Moreover, the disadvantage of low electrical resistance common to conventional magnetite particles remains unremedied.

Further, the magnetite particles disclosed by the publications also have other disadvantages that are poor fluidity and a tendency of the packed powder to excessively increase in density by vibrations during transportation and other handling, thereby seriously affecting the workability in the subsequent process of toner preparation.

As an improvement regarding the second problem, Japanese Patent Application Laid-Open Gazette No. (sho.)54-139544(139544/1979) teaches increasing the electrical resistance of magnetite particles by coating the surface with a silicon component. However, the approach again fails to improve the electrical resistance satisfactorily. It cannot meet the recent requirement for finer line reproduction of images, especially due to the inability to improve the remaining magnetization.

SUMMARY OF THE INVENTION

An object of the present invention which intends to solve the problems of the prior art, is to provide magnetite particles with low remanent magnetization, high electrical resistance, and excellent workability and fluidity, and also a process for producing the particles.

In attempts to achieve the object, the present inventors have made intensive studies and found that this object is achieved by not only having a silicon component contained in the interior of magnetite particles to be obtained but also having a silicon component, especially fine divided one, exposed on the surface thereof, thereby enabling both the silicon components to attain their synergistic effects. The present invention is based on this finding.

The magnetite particles of the present invention are each characterized by containing a silicon component present in the interior and a silicon component, especially finely divided one exposed on the surface The magnetite particles of the present invention require that a silicon component be present both in the interior and on the surface. If the particles contain a silicon component present in the interior but no silicon component is exposed on the surface, their electrical resistance is low and the fluidity poor. Further, if the particles contain only a silicon component exposed on the surface, the particles are inferior in the remaining magnetization. The term "a silicon component" as used herein means a compound based on silicon or silicon oxide.

The amount of the silicon component present as exposed on the surface (hereinafter referred to as "exposed silicon component") on the basis of the magnetite particles, in terms of silicon, preferably ranges from 0.1 to 2.0% by weight. (All the amounts of the silicon components are given in terms of silicon hereinafter.) If the amount of the exposed silicon component is less than 0.1% by weight, the obtained magnetite particles tend to achieve only limited improvements in electrical resistance, remaining magnetization and fluidity. If the amount exceeds 2.0% by weight, favorable properties are attained but the workability is sacrificed, with a possibility of filter cloth clogging at the time of water washing. For the production of magnetite particles, a water washing step is essential to remove the salts of alkalies, such as sodium and potassium, which are by-products of the synthesis. If the amount of the exposed silicon component is too large, the washing may result in the clogging of the filter cloth, thus reducing the workability. In addition, the excessive exposed silicon component involves a corresponding increase in silicon consumption which is not warranted economically.

The expression "the amount of the exposed silicon component" as used herein means the value obtained by the following analytical method.

First, 0.900 g of a sample is weighed and 25 ml of a 1N NaOH solution is added thereto. The solution is heated to 45° C. with stirring to dissolve the silicon present on the particle surface into the solution.

Following filtration-out of undissolved matter, the eluate (filtrate) is diluted to 125 ml with pure water. The amount of silicon contained in the eluate is determined by plasma emission spectrometry (ICP).

Exposed silicon component (wt %)={[silicon contained in the eluate (g/R)$\times$125$\div$1000]/0.900 (g)}$\times$100

The total silicon amount is determined by dissolving a sample in a hydrochloric-hydrofluoric acid mixed solution and then subjecting the resulting solution to plasma emission spectrometry (ICP).

As stated above, the magnetite particles of the present invention necessitate that a silicon component be present both in the interior and on the surface of each particle. It was not until the present inventors found the analytical method which draws a distinction between the silicon component exposed on the surface of magnetite particles and the silicon component present inside the particles that the present invention was accomplished.

With the magnetite particles of the present invention it is desirable for the electrical resistance, remaining magnetization and fluidity of the particles that the BET specific surface area (in m²/g) of the magnetite particles be represented by equation (1):

$$BET\ (m^2/g) = 6/(\text{particle dia. } (\mu m) \times 5.2) + B \quad (1)$$

and that when the amount of the exposed silicon component (wt %) is assumed to be A, the relation $B/A \geq 30$ is satisfied.

Conversely if the magnetite particles show a relation $B/A < 30$, the electrical resistance, the remaining magnetization and fluidity thereof are low.

It is generally believed that particles or powder having excellent dispersibility usually must have a small specific surface area for the particle diameter and also low oil absorption. THE magnetite particles of the present invention have a large specific surface area for the particle diameter and also high oil absorption. Since each of the magnetite particles of the present invention has silicon on its surface, the surface can easily wet with a resin, which is apparently contributory to the improved dispersibility.

Under the present invention, the ratio of the amount of the exposed silicon component (A) to the total amount of the silicon component in the magnetite particles (C; in terms of silicon), (A/C), is desired to be in the range of 0.05 to 0.7, more desirably in the range of 0.1 to 0.6, for the sake of their properties.

There will be described hereunder a preferable process for producing the magnetite particles of the present invention.

First, a silicon component is added to a solution comprising chiefly a ferrous salt. Desirably the Ferrous salt to be used for the present invention is Ferrous sulfate and the silicon component is a solution containing a silicon colloid prepared from a silicate compound.

The obtained solution is then mixed with from 1.0 to 1.1 equivalents of an alkali to the ferrous ions in the solution to form ferrous hydroxide.

An oxygen-containing gas, preferably air, is blown into the ferrous hydroxide at 60° to 100° C., preferably at 80° to 90° C. to subject the ferrous hydroxide to an oxidation reaction and so as to produce seed crystals. The extent of the oxidation reaction is controlled through the analysis of unreacted ferrous hydroxide and adjustment of the quantity of the oxygen-containing gas or aeration. It is important to maintain the pit in the range of 7 to 10 during the oxidation reaction.

In the course of the oxidation reaction, when the seed crystal production has accounted for 1 to 30%, preferably 2 to 10%, of the total amount of the oxidation product to be obtained, additional iron is replenished to adjust the total iron content in the reaction mixture to an amount of 0.9 to 1.2 equivalents, preferably 1.05 to 1.15 equivalents, to the amount of the alkali initially added. It is desirable that the additional iron to be used here take the form of a solution of a ferrous salt such as ferrous sulfate.

Under the same conditions as those described above, the oxidation reaction is continuously carried out to produce particles while the pH of the reaction mixture is maintained in the range of 6 to 10, preferably 6 to 9. The particles are then washed, filtered, dried, and ground by usual methods to give the desired magnetite particles.

In the process of the present invention, as stated above, the pH during the oxidation reaction is preferably adjusted with the range of 6 to 10. If the pH during the oxidation reaction is above the neutral region, silicon is incorporated into the magnetite particles. Conversely, if it is below neutral, silicon is scarcely incorporated in the interior but may be deposited on the surface.

The observation by the present inventors of the particle shape in the course of the oxidation reaction revealed that the seed crystals formed by the initial reaction are indefinite in shape, but they become spherical in the neutral to weakly alkaline (pH 6–9) environments in the latter half of the process. The spherical magnetite particles are preferably used for magnetic toners and the like. Since the magnetite particles obtained by the process of the present invention have silicon on their surfaces, the magnetite particles have both a high oil absorption and a large BET specific surface area, even if the magnetite particles are spherical. The term "spherical" used herein is intended to mean "being a sphere having the maximum diameter and the minimum diameter which satisfy the following relationship: (the max. dia.)/(the min. dia.) = 1.0–1.1".

Further, in accordance with the invention, the magnetite particles thus formed and washed with water may be then granulated during or after drying to attain more excellent fluidity and workability.

Effects of the Invention

As described above, the magnetite particles of the present invention exhibit high electrical resistance, low remanent magnetization, and good fluidity. Thus the magnetite particles may suitably be used as powdery material of magnetic toners for electrostatic copying.

The process of the present invention permits the mass production on an industrial scale of the magnetite particles having such desirable properties mentioned above.

DESCRIPTION OF THE PREFERRED EMBODIMENTS

The present invention will be better understood by the following Examples in comparison with the following Comparative Examples.

EXAMPLE 1

1005 g of sodium silicate having a SiO₂ grade (content) of 28% were weighed and added, following the pH adjustment, to 57 l of an aqueous solution of ferrous sulfate containing 2.4 mol/l of $Fe^{2+}$.

The aqueous solution of ferrous sulfate containing the silicic acid component was mixed with 65 l of a 4.3N aqueous solution of NaOH. Air was then blown into the mixed solution of at the flow rate of 40 l/min for 30 min to form seed crystals while the temperature of the mixed solution is maintained at 80° C.

Then, 6.5 l of an aqueous solution of ferrous sulfate having the same composition as that used for the formation of the seed crystals were added to the thus obtained iron hydroxide slurry containing the seed crystal particles, after which air was blown into the slurry at the flow rate of 40 l/min to subject the slurry to an oxidation reaction while the temperature of the slurry is maintained at 80° C. In the course of the oxidation reaction, when a decrease in pH was detected, a 12.5N aqueous solution of NaOH was added to the slurry to maintain the pit of the slurry in the range of pH 8 to 10. The oxidation reaction was terminated in 6 hours.

The resultant particles were washed, filtered, dried, and ground by usual methods.

The magnetite particles thus obtained were tested to determine the amount of the exposed silicon component (in terms of silicon), particle diameter, workability, electrical resistance, remaining magnetization, static charge, fluidity, oil absorption, etc. The obtained results are shown in Table 1. The amount of the exposed silicon component was determined by the analytical method described above, and the others such as the particle diameter, electrical resistance, were measured by the following methods.

Measuring methods (1) Particle diameter

The magnetite particles tested were photographed by a transmission electron micrograph (magnification: 30000×). The diameters of the particles shown on the photograph were measured and the average was taken as the particle diameter.

(2) Workability

This was evaluated from whether or not the filter cloth used was clogged during the water washing step.

(3) Electrical resistance 10 g of a sample was placed in a sample holder and compressed under a pressure of 600 kg/cm$^2$ into a tablet of 25 mm in diameter. Electrodes were attached to the tablet, and its electrical resistance was determined under a pressure of 150 kg/cm$^2$. The electrical resistance of the magnetite particles was calculated from the thickness, cross-sectional area, and the obtained resistivity value of the sample tablet used.

(4) Remaining magnetization ($\sigma_r$)

This was determined with an applied magnetic field of 10 kOe, using a vibrating sample type magnetometer (Model VSM-P7 manufactured by Toei Kogyo Co., Ltd.). Any $\sigma_r$ value within the range of 5 to 6 emu/g was rated "medium", that which exceeded the range was rated "high", and that which fell below the range rated "low".

(5) Fluidity

The angle of repose and the degree of aggregation of the magnetite particles tested were measured using a powder tester manufactured by Hosokawa Micron Co.,Ltd. Particles with an angle of repose not greater than 40 deg were indicated "small" and those greater than 40 deg "large". The smaller the angle of repose and the degree of aggregation, the higher the fluidity the powder was judged to possess.

(6) Static charge

This was determined using an iron powder carrier by the blow-off method.

(7) Oil absorption

This was measured in accordance with JIS K 5101.

EXAMPLES 2 to 7

Magnetite particles were obtained in the same manner as that described in the Example 1 except that the amount of sodium silicate added, the pH during the oxidation reaction (crystal growth reaction), and the diameter of the resulting particles were varied.

The properties and characteristics of those magnetite particles were determined in the same way as that in the Example 1, respectively. The obtained results are given in Table 1.

EXAMPLE 8

Magnetite particles were obtained in the same manner as that described in the Example 3 except that the particles grown in the same manner as that in the Example 3 were further granulated after the washing step.

The properties and characteristics of the magnetite particles were determined in the same way as that in the Example 1. The obtained results are given in Table 1.

EXAMPLE 9

Magnetite particles were obtained in the same manner as that described in the Example 3 with the exception that the particles were formed to be pseudohexahedron in shape by the use of sodium carbonate as the alkali.

The properties and characteristics of the magnetite particles were determined in the same way as that in the Example 1. The obtained results are given in Table 1.

EXAMPLE 10

Magnetite particles were obtained in the same manner as that described in the Example 1 except that the pH during the oxidation reaction (crystal growth reaction) was adjusted to 10 to 12. There was no silicon component present on the surface of the obtained magnetite particles.

500 g of the magnetite particles containing a silicon component merely inside was slurried in a ratio of 100 g/l, The slurry was stirred while the temperature thereof was kept at 50 ° C. Subsequently, the slurry was incorporated with 2.7 g of sodium silicate having a $SiO_2$ grade of 28%, and stirred for 30 min, after which 1N $H_2SO_4$ was gradually added to the slurry to adjust the pH to 7 over an hour and thereby to coat the particle surface with the silicon component.

The resultant particles were washed, filtered, dried, and ground by usual methods.

The properties and characteristics of the magnetite particles so obtained were determined in the same way as that of the Example 1. The obtained results are given in Table 1.

EXAMPLES 11 TO 12

Magnetite particles were obtained in the same manner as that described in the Example 10 except that the amount of sodium silicate added was varied.

The properties and characteristics of those magnetite particles were determined in the same way as that of the Example 1. The obtained results are given in Table 1.

COMPARATIVE EXAMPLE 1

Magnetite particles were obtained in the same manner as that described in the Example 3 except that no sodium silicate was added.

The properties and characteristics of the magnetite particles were determined in the same way as that of the Example 1. The obtained results are given in Table 1.

COMPARATIVE EXAMPLE 2

Magnetite particles were obtained in the same manner as that described in the Example 1 except that the pit during the oxidation reaction (crystal growth reaction) was adjusted within the range of 10 to 12. There was no silicon component present on the surfaces of the obtained magnetite particles.

The properties and characteristics of the magnetite particles were determined in the same way as that of the Example 1. The obtained results are given in Table 1.

sho.)54-139544 (139544/1979), magnetite particles coated with a silicon component were obtained.

The properties and characteristics of the magnetite particles were determined in the same way as that of the Example 1. The obtained results are given in Table 1.

COMPARATIVE EXAMPLE 5

Generally in conformity with the procedure taught in Japanese Patent Application Laid-Open Gazette No.(-sho.)61-155223 (155223/1986), magnetite particles lo containing a silicon component in their insides only were obtained.

The properties and characteristics of the magnetite particles were determined in the same way as that of the Example 1. The obtained results are given in Table 1.

TABLE 1

| Example Comp. Ex. | pH value of reaction mixure during oxidation reaction (crystal growth reaction) | Amount of silicon (wt % based on $Fe_3O_4$) | | | Particle diameter (μm) | BET ($m^2/g$) | B/A *1 | A/C |
|---|---|---|---|---|---|---|---|---|
| | | Amount of exposed silicon (A) | Total amount of silicon (C) | Amount of silicon present inside (C − A) | | | | |
| Example 1 | 8-10 | 0.14 | 1.08 | 0.96 | 0.20 | 15 | 66 | 0.13 |
| Example 2 | 7-9 | 0.21 | 1.20 | 0.99 | 0.21 | 16 | 50 | 0.18 |
| Example 3 | 6-8 | 0.52 | 1.50 | 0.98 | 0.21 | 36 | 59 | 0.35 |
| Example 4 | 6-8 | 1.47 | 2.27 | 0.80 | 0.20 | 55 | 33 | 0.65 |
| Example 5 | 6-8 | 2.30 | 3.40 | 1.10 | 0.19 | 78 | 31 | 0.68 |
| Example 6 | 6-8 | 0.39 | 1.23 | 0.84 | 0.11 | 25 | 37 | 0.32 |
| Example 7 | 6-8 | 0.34 | 0.89 | 0.55 | 0.21 | 18 | 36 | 0.38 |
| Example 8 | 6-8 | 0.52 | 1.50 | 0.98 | 0.21 | 27 | 41 | 0.35 |
| Example 9 | 8-10 | 0.33 | 1.48 | 1.15 | 0.19 | 19 | 39 | 0.22 |
| Example 10 | 10-12 | 0.07 | 1.15 | 1.08 | 0.19 | 7 | 13 | 0.06 |
| Example 11 | 10-12 | 0.20 | 1.28 | 1.08 | 0.19 | 8 | 10 | 0.16 |
| Example 12 | 10-12 | 0.51 | 1.59 | 1.08 | 0.19 | 9 | 6 | 0.32 |
| Comp. Ex. 1 | 6-8 | 0 | 0 | 0 | 0.22 | 6 | — | — |
| Comp. Ex. 2 | 10-12 | 0 | 1.08 | 1.08 | 0.19 | 6 | — | 0 |
| Comp. Ex. 3 | 6-8 | 0.13 | 0.13 | 0 | 0.22 | 7 | 14 | 1.00 |
| Comp. Ex. 4 | 6-8 | 0.15 | 0.15 | 0 | 0.22 | 6 | 5 | 1.00 |
| Comp. Ex. 5 | 6-7 | 0 | 0.14 | 0.14 | 0.18 | 8 | — | 0 |

| Example Comp. Ex. | Oil absorption (ml/100 g) | Workability | Electrical resistance (Ωcm) | Remanent magnetization (σr) | Static charge (μc/g) | Fluidity | | Evaluation |
|---|---|---|---|---|---|---|---|---|
| | | | | | | Angle of repose (%) | Degree of aggregation | |
| Example 1 | 23 | ○ | 9 × 10$^4$ | Low | −30 | Small | 15 | ○ |
| Example 2 | 24 | ○ | 2 × 10$^5$ | Low | −35 | Small | 11 | ○ |
| Example 3 | 26 | ○ | 5 × 10$^6$ | Low | −46 | Small | 10 | ○ |
| Example 4 | 36 | Δ | 1 × 10$^7$ | Low | −68 | Small | 10 | ○ |
| Example 5 | 48 | x | 6 × 10$^7$ | Low | −90 | Small | 9 | ○ |
| Example 6 | 24 | ○ | 2 × 10$^5$ | Medium | −33 | Small | 12 | ○ |
| Example 7 | 22 | ○ | 2 × 10$^5$ | Low | −46 | Small | 10 | ○ |
| Example 8 | 26 | ○ | 2 × 10$^5$ | Low | −44 | Small | 2 | ○ |
| Example 9 | 24 | ○ | 8 × 10$^4$ | Medium | −29 | Small | 20 | ○ |
| Example 10 | 30 | ○ | 9 × 10$^3$ | Medium | −41 | Large | 43 | Δ |
| Example 11 | 31 | ○ | 1 × 10$^4$ | Medium | −67 | Large | 34 | Δ |
| Example 12 | 33 | ○ | 4 × 10$^4$ | Medium | −80 | Large | 31 | Δ |
| Comp. Ex. 1 | 20 | ○ | 1 × 10$^3$ | High | −19 | Large | 48 | x |
| Comp. Ex. 2 | 29 | ○ | 4 × 10$^3$ | Medium | −14 | Large | 45 | x |
| Comp. Ex. 3 | 22 | ○ | 4 × 10$^3$ | High | −40 | Large | 39 | Δ |
| Comp. Ex. 4 | 21 | ○ | 2 × 10$^3$ | High | −24 | Small | 38 | Δ |
| Comp. Ex. 5 | 16 | ○ | 7 × 10$^3$ | Medium | — | Small | 60 | x |

*1 : B = BET ($m^2/g$) - {6/ (Particle dia. (μm) × 5.2)}

COMPARATIVE EXAMPLE 3

The magnetite particles obtained in the Comparative Example 1 were further coated with a silicon component in conformity with the coating procedure of the Example 10.

The properties and characteristics of the resultant magnetite particles were determined in the same manner as that of the Example 1. The obtained results are given in Table 1.

COMPARATIVE EXAMPLE 4

Generally in conformity with the procedure taught in Japanese Patent Application Laid-Open Gazette No.(-

It is apparent from the results indicated in Table 1 that the magnetite particles of the Examples 1 through 9, all obtained by the process of the present invention, proved satisfactory in all of electrical resistance, remanent magnetization and fluidity. The magnetite particles of the Example 4, which had a Fairly large amount of the exposed silicon component, were somewhat inferior in workability and economics.

The magnetite particles of the Examples 10 to 12 which were obtained by coating magnetite particles containing silicon merely inside with a silicon component by immersion, were inferior in electrical resistance, remanent magnetization and fluidity to those of the Examples 1 through 9 but the values fell within allowable ranges.

On the other hand, the magnetite particles of the Comparative Example 1 that contained no silicon component, those of the Comparative Examples 2 and 5 that contained a silicon component merely in the interior, and those of the Comparative Examples 3 and 4 which had a silicon component only exposed on the surface were all small in electrical resistance and large in remanent magnetization. Further, the magnetite particles of the Comparative Examples 1, 2 and 5 were inferior in fluidity, too.

What is claimed is:

1. Magnetite particles containing a silicon and/or silicon oxide compound in the interior thereof and also a silicon and/or silicon oxide compound exposed on the surface thereof, said silicon and/or silicon oxide compound on the surface being in an amount of from 0.1 to 2.0% by weight in terms of silicon with respect to the total amount of each of said magnetite particles and the ratio of the amount of the exposed silicon and/or silicon oxide compound to the total amount of said silicon and/or silicon oxide compound in each of said magnetite particles in terms of silicon, being in the range of 0.05 to 0.7, each of said magnetite particles having a shape of a sphere with a maximum diameter and a minimum diameter which satisfy the following relationships: (maximum diameter)/(minimum diameter)=1.00-1.1.

2. Magnetite particles according to claim 1 which exhibit a BET specific surface area and a particle diameter which satisfy the following relation:

$$B/A \geqq = 30$$

wherein A is the amount of said silicon and/or silicon oxide compound exposed on the surface and B is a value calculated on the basis of the following equation BET $(m^2/g) = 6/(\text{particle dia. } (\mu m) \times 5.2) + B$.

3. Magnetite particles according to claim 1, wherein each of said magnetite particles has the shape of a pseudohexahedron.

* * * * *